United States Patent Office 3,326,988
Patented June 20, 1967

3,326,988
STABILIZED METHYL CHLOROFORM COMPOSITIONS WITH IMPROVED EVAPORATION CHARACTERISTICS
Roy E. Stack, Pittsburgh, Pa., assignor to Pittsburgh Plate Glass Company, Pittsburgh, Pa., a corporation of Pennsylvania
No Drawing. Filed July 13, 1964, Ser. No. 382,390
4 Claims. (Cl. 260—652.5)

This invention relates to methylchloroform. It more particularly concerns methylchloroform compositions possessing characteristics which improve the usefulness of the methylchloroform.

Methylchloroform, 1,1,1-trichloroethane, is a normally liquid chlorinated hydrocarbon which finds considerable value as an industrial solvent. Despite having highly advantageous solvent properties, the extent of methylchloroform's commercial usage is limited by virtue of its tendency to decompose, especially under conditions of use.

Addition to the methylchloroform of one or more of a large number of compounds is described in the literature as a means for imparting stability of methylchloroform. Among the compounds which may be added either alone or in combination with other additives to methylchloroform to impart improved stability characteristics are alcohols. U.S. 2,811,252 describes methylchloroform compositions which include minor amounts of nonprimary alkanols containing from 4 to 8 carbon atoms per molecule. Methylchloroform compositions which include aliphatic monohydric acetylenic alcohols of less than 8 carbon atoms are described in U.S. 2,838,458. U.S. 3,000,978 shows tertiary butyl alcohol improves the stability of methylchloroform. In U.S. 3,070,634, methylchloroform compositions containing both acetylenically unsaturated monohydric alcohols and saturated alcohols are shown to possess improved stability. According to this patent, mostly these acetylenically unsaturated monohydric alcohols are 3 to 12 carbon acetylenic alcohols and the saturated alcohols are notably lower molecular weight saturated alkanols of 1 to 8 carbons.

Despite the advantageous results which accrue with the use of monohydric alcohols in methylchloroform compositions, such alcohols appear to have an adverse effect on other properties. The nature of the evaporation from a nonporous surface of a methylchloroform composition in which even a minor amount (e.g., 0.75 percent by weight) of monohydric alcohol has been incorporated differs from that which is observed when no such alcohol is present. Thus, when methylchloroform compositions containing a monohydric alcohol are evaporated from a surface, usually a metal surface, they leave spots on the surface. Such spots or "spotting" (as the effect is frequently referred to) is advantageously avoided.

Now it has been discovered that these limitations of alcohol containing methylchloroform compositions may be overcome by incorporating even small amounts of perchloroethylene in the composition. Thus, pursuant to the present invention, perchloroethylene is included in an alcohol containing methylchloroform composition to provide compositions of methylchloroform which evidence desirable type of evaporation and which do not exhibit significant spotting.

Concentrations of perchloroethylene from about 0.05 to 5 weight percent basis the methylchloroform content of the methylchloroform composition provide desirable results, although the concentration is more usually in the range of 0.25 to about 3.0 weight percent basis the methylchloroform content of the composition. Even higher concentrations (up to 10 weight percent) are operative but rarely can be economically justified.

Use of perchloroethylene pursuant to this invention is applicable to any alcohol containing methylchloroform composition, e.g., any methylchloroform to which alcohol has been added to improve the stability, reduce the corrosiveness, etc., of the methylchloroform.

This invention is, accordingly, applicable to the compositions provided by incorporating in methylchloroform any of the large number of monohydric aliphatic alcohols, both saturated and unsaturated, which are suggested by the patent literature described hereinbefore. Most of these alcohols contain no more than 8 carbon atoms and usually at least 4 carbon atoms. Alcohols such as tertiary butyl alcohol, secondary butyl alcohol, isobutyl alcohol, tertiary amyl alcohol, 2-octanol, and the like are representative of the saturated monohydric alkanols mentioned in the patent literature as being of especial value. Lower aliphatic monohydric unsaturated alcohols, notably acetylenically unsaturated alcohols containing 8 carbon atoms or less are also included in methylchloroform for stabilization purposes. Among these, 2-methyl-3-butyne-2-ol, 3-methyl-1-pentyne-3-ol, 2-butyne-1-ol, 2-methyl-3-hexyn-2-ol and propargyl alcohol may be mentioned by way of illustration.

In general, the alcohol concentration in the methylchloroform can be varied considerably, depending upon the stabilizing function the alcohol or mixture of alcohols is to perform and whether other stabilizing additives are present. Rarely is the alcohol content of tre methylchloroform less than 0.05 weight percent. More normally, the monohydric alcohol content of the methylchloroform composition will range from 0.5 to 5.0 percent (most frequently 1.0 to 2.0 percent) by weight of the methylchloroform. Higher concentrations, e.g., above 5 percent by weight of the methylchloroform, are rarely employed although operable.

In the methylchloroform compositions herein contemplated, the perchloroethylene content usually is 50 to 500 percent by weight of the alcohol content. An illustrative methylchloroform composition herein contemplated is provided by adding to the methylchloroform an amount of perchloroethylene which is from one-half to two times the weight of alcohol or mixture of alcohols also added to the methylchloroform. For example, if alcohol in an amount of 1 percent by weight has been added to the methylchloroform, the amount of added perchloroethylene will typically be between 0.5 to 5.0 weight percent of the methylchloroform.

The following examples illustrate the performance of methylchloroform compositions which illustrate the present invention:

Example I

A composition of methylchloroform was prepared which contained the following:

| Additive: | Percent by weight methylchloroform |
|---|---|
| t-Butyl alcohol | 2.0 |
| Nitromethane | 2.0 |
| t-Amyl alcohol | 1.0 |
| Butylene oxide | 0.5 |
| Dimethoxyethane | 0.2 |

Varying amounts of perchloroethylene were added (as indicated in Table I) to this composition and the resulting formulation evaluated to determine its rate of evaporation by a procedure which involved pipetting out 2 milliliters of the solvent composition into an indentation in the center of a small stainless steel plate and measuring how long it takes until the solvent has all evaporated (until the plate appears dry).

Table I tabulates the compositions tested and the results:

TABLE I

| Additive | Percent by Volume Methylchloroform | Evaporation Time, Minutes and Seconds |
| --- | --- | --- |
| None | | 16:35; 16:37 |
| Perchloroethylene | 0.5 | 11:36; 12:36 |
| Do | 1.0 | 11:44; 10:59 |
| Do | 2.0 | 10:30; 10:43 |
| Do | 3.0 | 9:17; 9:49 |
| Do | 4.0 | 8:00; 8:10 |
| Do | 5.0 | 7:53; 7:55 |

*Example II*

A methylchloroform composition was prepared containing these additives:

Additive:  Percent by weight methylchloroform
- t-Butyl alcohol _____ 2.0
- Nitromethane _____ 2.0
- Isobutyl alcohol _____ 1.0
- Butylene oxide _____ 0.5
- 2-methyl-3-butyne-2-ol _____ 0.5

To samples of this methylchloroform composition perchloroethylene (in the amounts listed in the following Table II) was added and the resulting compositions tested to determine their rates of evaporation by the procedure described in Example I.

Table II lists the details and results:

TABLE II

| Additive | Percent by Volume Methylchloroform | Evaporation Time, Minutes and Seconds |
| --- | --- | --- |
| None | | 20:56; 20:04 |
| Perchloroethylene | 2.0 | 10:55; 10:49 |
| Do | 3.0 | 9:51; 9:29 |
| Do | 5.0 | 8:13; 7:52 |

The foregoing data demonstrate that the addition of perchloroethylene even in small amounts to an alcohol containing methylchloroform composition improves significantly the composition's rate of evaporation.

The methylchloroform samples described in Examples I and II were tested to ascertain what if any residue remains after permitting them to evaporate from a sheet of polished metal. The procedure involves slowly pouring the solvent composition along the length of a polished 8 by 36 inch panel of aluminum supported at an angle of about 45 degrees and allowing it to evaporate from the surface.

Without added perchloroethylene, the compositions described in Examples I and II left noticeable residues (spots or stains) on the plate. When 2 percent by volume of perchloroethylene was added to each of the formulations, no stain was observed.

Use of perchloroethylene in an alcohol containing methylchloroform composition extends to methylchloroform compositions which contain not only alcohols but other additives including those which are present as stabilizers. As the compositions in Examples I and II demonstrate, methylchloroform often has incorporated therein a plurality of additives besides alcohols for the purpose of imparting beneficial stability or anti-corrosion properties to the methylchloroform.

Thus, nitroaliphatic compounds, notably 1 to 3 carbon nitroalkanes such as nitromethane, nitroethane, alpha-nitropropane, beta-nitropropane and 2-chloro-nitroethane, may be present. Also, the presence of 2 to 10 carbon epoxides other than butylene oxide, including ethylene oxide, propylene oxide, 2-mehtyl-1,2-epoxypropane, epichlorohydrin, styrene oxide, glycidol, amylene oxide, 1,2-epoxyoctane, epoxycyclopentene, cyclohexene oxide; diepoxides illustrated by butadiene dioxide and cyclopentadiene diepoxide.

Dioxolane (1,3-dioxolane) or substituted 1,3-dioxolanes including 2-mehtyl-1,3-dioxolane, 2-ethyl-1,3-dioxolane, 2-isopropyl dioxolane, 2,2-dimethyl-1,3-dioxolane, 2 - methyl - 4 - methyl - 1,3 - dioxolane, 5,5 - dimethyl-1,3 - dioxolane, 2 - chloro - 4 - methyl - 1,3 - dioxolane may be present. Dioxane, tetrahydrofuran, furan, pyran and other cyclics are of use. Ketones, nitriles, dialkoxy alkanes are among the classes of other additives which may be incorporated.

While this invention has been illustrated and is principally applicable to methylchloroform solvent compositions in which methylchloroform is the principal or main solvent (or as the art sometimes specifies, the "base" solvent), the invention is applicable with respect to solvent compositions in which methylchloroform is but one of several solvents. Thus, the invention is pertinent to solvent compositions of methylchloroform in combination with one or more other chlorinated hydrocarbon solvents such as methylene chloride, carbon tetrachloride, chloroform, 1,2-dichloroethane and trichloroethylene. Specific solvent mixtures of this type include 60–95 percent methylchloroform and 40–5 percent 1,2-dichloroethane by weight; and 65–95 percent methylchloroform and 35–5 percent trichloroethylene.

While the present invention has been described by reference to specific details of certain embodiments, it is not intended that it be construed as limited to such details except insofar as they appear in the appended claims.

What is claimed is:

1. Methylchloroform containing at least about 0.05 weight percent of an aliphatic monohydric alkanol having up to 8 carbon atoms and from about 0.05 to 10 weight percent perchloroethylene.

2. Methylchloroform containing a minor concentration of an aliphatic monohydric alcohol selected from the group consisting of 1 to 8 carbon alkanols and 3 to 12 carbon alkinols and a small concentration of at least about 0.05 percent of perchloroethylene.

3. Methylchloroform containing at least 0.05 weight percent of an aliphatic monohydric 3 to 12 carbon alkinol and from 0.05 to 5.0 percent by weight of perchloroethylene.

4. Methylchloroform stabilized with from 0.05 to 5.0 weight percent of aliphatic monohydric alcohol selected from the group consisting of 3 to 12 carbon atom alkinols and alkanols having up to 8 carbon atoms nad containing from 0.5 to 5.0 weight percent of perchloroethylene.

References Cited

UNITED STATES PATENTS 3,090,818  5/1963  Long _____ 260—652.5

LEON ZITVER, *Primary Examiner.*

BERNARD HELFIN, MATTHEW M. JACOB,
*Assistant Examiners.*